May 19, 1925. 1,538,207

E. F. NIEDECKEN

VALVE

Filed Nov. 8, 1924

INVENTOR.

*Edward F. Niedecken.*

BY

*Bottum, Hudnall, Lecher and McNamara.*

ATTORNEYS

Patented May 19, 1925.

1,538,207

UNITED STATES PATENT OFFICE.

EDWARD F. NIEDECKEN, OF MILWAUKEE, WISCONSIN.

VALVE.

Application filed November 8, 1924. Serial No. 748,510.

*To all whom it may concern:*

Be it known that I, EDWARD F. NIEDECKEN, a citizen of the United States, residing at Milwaukee, in the county of Milwaukee and State of Wisconsin, have invented certain new and useful Improvements in Valves, of which the following is a specification, reference being had to the accompanying drawing, forming a part thereof.

This invention relates to improvements in valves.

For the purpose of showing one application of the invention and to teach the principle involved, reference is made particularly to Letters Patent No. 1,054,023 issued to me February 25, 1913, for improvements in mixing valves. The mixing valve shown and described in the above patent comprises, in general, a pair of valves provided with stems, and an operating member or yoke, the valve stems loosely fitting the yoke to permit a certain amount of freedom of movement or play of the valves with respect to the latter to compensate for any inaccuracy in workmanship and fitting so that the packing rings or gaskets for the valves close evenly and tightly upon their respective seats. One of the valves above referred to admits cold water to the valve casing while the other valve admits hot water thereto, the valves being so formed and arranged that upon actuation in a given direction of the operating yoke the amount of cold water admitted to the casing gradually decreases while the amount of hot water gradually increases, the sum of the two remaining substantially constant. Movement of the yoke in the opposite direction produces an opposite result, the amount of hot water then decreasing while the amount of cold water increases.

It has been found from experience that although there may be considerable pressure on the supply side of the valves referred to above, they sometimes stick or freeze to their seats sufficiently to resist this pressure to unseat them, especially where the device remains idle for any great length of time. When this sticking of the valves occurs, the hot water valve will not begin to open until the operating yoke has been moved a sufficient distance axially to take up the loose fit between itself and the valve. The result of this action is that the cold water valve is open too far before the hot water valve starts to open. When the operating yoke does engage the hot water valve and starts it from its seat, the water immediately forces the valve upwardly against the yoke, allowing a comparatively large amount of hot water to rush into the valve casing, causing the temperature of the stream at the discharge side of the casing to increase too rapidly. The ring or gasket for the hot water valve, furthermore, has been found to wear away more rapidly than the gasket for the cold water valve, the result being that in time the valves do not seat properly. To allow for this unequal wearing away of the gaskets, the fit between the valve stems and operating yoke has been made loose enough to permit of a greater amount of movement or play of the valves. This practice, however, has been found to be undesirable for the reason that there is then so much play of the valves that the same are caused to vibrate and give rise to an undesirable humming or buzzing sound.

One of the objects of the present invention, therefore, is to provide an improved construction and arrangement of parts whereby all objectionable looseness between a valve and the actuating member therefor will be eliminated without interfering with the play between the valve and operating member necessary to its proper seating.

Another object is to provide improved means to compensate for the loose fit between the valve stems and operating yoke of a mixing valve of the type shown in my Patent No. 1,054,023, without losing any of the advantages of the loose fit between the valve stems and yoke.

Another object is to provide improved means to compensate for any looseness between a valve and its actuator which is simple, readily applied and which may be economically manufactured.

Other objects and advantages will hereinafter appear.

For the purpose of illustrating the invention, the same is shown and described as applied to a mixing valve constructed in accordance with the disclosure of Letters Patent No, 1,054,023. The invention of course is not limited to this particular application, but is well adapted for use in connection with valves of various other kinds.

Referring now more particularly to the drawings.

Figure 1:
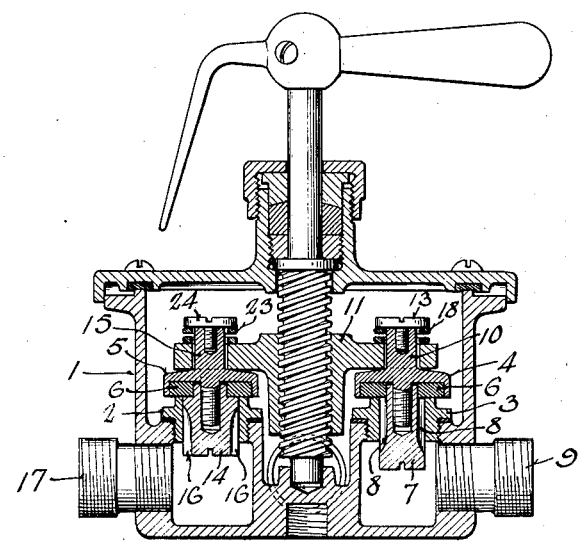
Figure 1 is a central vertical section through a mixing valve of the construction described in my above patent, showing the improved compensating means applied thereto.

As described in my above patent, the valve casing 1 is provided with valve seats 2 and 3 upon which valve discs 4 and 5, respectively, seat, packing rings or gaskets 6 being arranged between the discs and seats to provide a water-tight connection. A graduating plug 7 is slidable through valve seat 3 and provided with passages 8 arranged to admit cold water through a supply connection 9 into the valve casing. The graduating plug 7 is provided with a stem 10 loosely fitted through one arm of a supporting yoke 11 to leave an appreciable space such as at 12 between stem 10 and the yoke. A screw 13 is threaded into the upper end of stem 10 to hold the valve in position upon the yoke.

In the valve as shown in my patent above identified, the length of stem 10 is substantially equal to the thickness of the arm of yoke 11, so that the head of screw 13 contacts with the upper face of the yoke arm.

In accordance with the present invention, it is contemplated to so construct stem 10 as to provide an appreciable space between the head thereof and the yoke when the parts are operatively positioned, and to insert between the head and yoke a compensating element as and for the purposes hereinafter described.

A graduating plug 14 is slidable through seat 2 and provided with a stem 15 loosely fitted to the opposite arm of yoke 11, plug 14 being provided with passages 16 arranged to admit hot water to the valve casing from a supply connection 17. This side of the mixing valve is similar to the cold water side and valve therefor, and is only referred to for the purpose of showing the manner in which my improved compensating means may be applied to the mixing valve described in my above patent.

Figure 3:
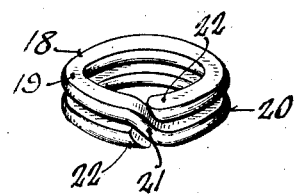
Fig. 3 is a perspective view.

Referring more particularly to Fig. 3, the compensating means, as preferably constructed, comprises a coil spring 18 having two coils 19 and 20 and an axially offset portion 21, the ends 22 of the spring fitting the opposite sides of the offset portion, as shown, so that the coils lie in parallel planes. A spring made in this manner is flat at both ends so that substantially the entire amount of each coil 19 and 20 contacts with the respective parts to be pressed apart, as hereinafter more fully explained. The advantage of constructing spring 18 in this manner will presently be obvious.

Figure 2:
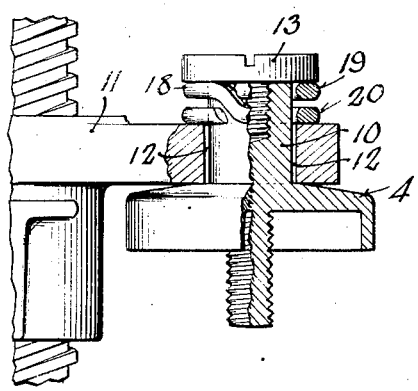
Fig. 2 is an enlarged detail view partly in section.

As shown in Fig. 2, spring 18 is arranged upon stem 10 between the yoke arm and the head of screw 13, the spring being compressed between these parts. A similar spring 23 is arranged upon stem 15 between the opposite yoke arm and the head of screw 24. Substantially the entire portion of each coil 19 and 20 engages the adjacent surfaces of the head of screw 13 and the yoke arm, respectively. There is therefore a uniform pressure over substantially the entire under face of the screw head. In this manner, stem 10 is urged upwardly in an axial direction and prevented from skewing out of alignment with the vertical.

From the foregoing it will be seen that by arranging resilient elements such as springs 18 and 23 upon the valve stems 10 and 15, respectively, in the manner above described, vertical looseness of the valve stems with respect to the actuating yoke is overcome. The valves are thus made to follow exactly the opening and closing movements of the yoke without interfering with the desired lateral freedom of movement or play of the valves to permit proper seating thereof. It is thereby possible to vary the temperature of the water at the discharge side of the casing gradually and smoothly without losing any of the advantages of the loose fit between the valves and operating yoke therefor. The improved compensating means also prevents vibration of the valve stems and the consequent humming or buzzing sound.

Various changes in structure and arrangement of the parts may be made without departing from the spirit of the invention or the scope of the claims.

The invention claimed is—

1. The combination with a valve having a stem, and an actuating member therefor, said stem loosely fitting said member, of means arranged and adapted to cause said valve to follow exactly the opening and closing movements of said member while permitting lateral freedom of movement of said valve with respect to said member.

2. The combination with a valve having a stem, and an actuating member therefor, said stem loosely fitting said member, of a spring arranged upon said stem and adapted to cause said valve to follow exactly the opening and closing movements of said member while permitting play of said valve with respect to said member.

3. The combination with a valve having a stem, and an actuating member therefor, said stem loosely fitting said member, of means arranged and adapted to cause said valve to follow exactly the opening and closing movements of said member while permitting play of said valve with respect to said member, said means comprising a coil spring offset intermediate its ends with the latter terminating adjacent said offset portion in such wise that the outer coils of said spring lie in parallel planes.

4. The combination with a valve having a stem provided with a head, and an actuating member therefor, said stem loosely fitting said member, of resilient means arranged upon said stem between said head and member and adapted to cause said valve to follow exactly the opening and closing movements of said member while permitting play of said valve with respect to said member.

In witness whereof I hereto affix my signature.

EDWARD F. NIEDECKEN.